US012645336B2

(12) United States Patent
Sakaguchi

(10) Patent No.: US 12,645,336 B2
(45) Date of Patent: Jun. 2, 2026

(54) INFORMATION PROCESSING APPARATUS, NON-TRANSITORY COMPUTER READABLE MEDIUM STORING INFORMATION PROCESSING PROGRAM, AND INFORMATION PROCESSING METHOD FOR NOTIFYING USER WITH NOTIFICATION MESSAGE WHILE AVOIDING IMPORTANT IMAGE

(71) Applicant: FUJIFILM Business Innovation Corp., Tokyo (JP)

(72) Inventor: Katsutoshi Sakaguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/750,407

(22) Filed: May 23, 2022

(65) Prior Publication Data

US 2023/0195274 A1      Jun. 22, 2023

(30) Foreign Application Priority Data

Dec. 21, 2021      (JP) ................................. 2021-207589

(51) Int. Cl.
*H04N 1/00* (2006.01)
*G06F 3/0481* (2022.01)

(52) U.S. Cl.
CPC .. *G06F 3/0481* (2013.01); *G06F 2203/04803* (2013.01); *H04N 1/00472* (2013.01); *H04N 1/00506* (2013.01)

(58) Field of Classification Search
CPC ........ G06F 3/0481; G06F 2203/04803; H04N 1/00472; H04N 1/00506; H04L 51/42; H04L 51/224
See application file for complete search history.

(56) References Cited

U.S. PATENT DOCUMENTS

| | | | |
|---|---|---|---|
| 2006/0064716 A1* | 3/2006 | Sull ........................ | G06F 16/784 |
| | | | 715/201 |
| 2006/0236233 A1 | 10/2006 | Ozawa et al. | |
| 2010/0169421 A1* | 7/2010 | Denner ................. | H04L 51/043 |
| | | | 709/224 |
| 2016/0372085 A1* | 12/2016 | Lee ..................... | G06F 3/04883 |
| 2017/0075553 A1 | 3/2017 | Ueno | |
| 2018/0004389 A1 | 1/2018 | Miyamoto et al. | |

(Continued)

FOREIGN PATENT DOCUMENTS

| | | |
|---|---|---|
| JP | 2013105182 | 5/2013 |
| JP | 2017058851 | 3/2017 |

(Continued)

OTHER PUBLICATIONS

JP2013105182A (Eng Translation) by Maruyama et al. Published on May 30, 2013.*

(Continued)

*Primary Examiner* — Rinna Yi
(74) *Attorney, Agent, or Firm* — JCIPRNET

(57) ABSTRACT

An information processing apparatus includes: a processor configured to: in a case where a notification message for notifying a user is newly displayed, display the notification message while avoiding an important image having an importance higher than a predetermined threshold value, among display images that are previously displayed.

4 Claims, 11 Drawing Sheets

(56) References Cited

U.S. PATENT DOCUMENTS

2021/0334547 A1* 10/2021 Cohen-Tidhar ........ G06V 10/82
2023/0007335 A1* 1/2023 Gupta ................ H04N 21/4402

FOREIGN PATENT DOCUMENTS

| | | |
|---|---|---|
| JP | 2018005428 | 1/2018 |
| WO | 2006049150 | 5/2006 |

OTHER PUBLICATIONS

"Notice of Reasons for Refusal of Japan Counterpart Application", issued on Aug. 5, 2025, with English translation thereof, p. 1-p. 5.
"Decision of Refusal of Japan Counterpart Application", issued on Dec. 2, 2025, with English translation thereof, p. 1-p. 5.

* cited by examiner

| NAME | IMPORTANCE | DISPLAY POSITION | SHAPE |
|---|---|---|---|
| STOP BUTTON | 90 | X: 400, Y: 0 | WIDTH: 80, HEIGHT: 20 |
| TITLE | 40 | X: 0, Y: 0 | WIDTH: 400, HEIGHT: 20 |
| TEXT | 60 | X: 0, Y: 25 | WIDTH: 380, HEIGHT: 150 |
| ANIMATION | 10 | X: 0, Y: 180 | WIDTH: 380, HEIGHT: 90 |

SOFTWARE NEEDS TO BE UPDATED.
THERE ARE TWO OTHER NOTIFICATIONS.

26E

DESTINATION: ○× COMPANY
DOCUMENT SIZE: A4
IMAGE QUALITY: HIGH IMAGE QUALITY
PAGE: 5

26D

26C

26

26B

26A

FAX

STOP

DESTINATION: ○× COMPANY

SOFTWARE NEEDS TO BE UPDATED.
THERE ARE TWO OTHER NOTIFICATIONS.

26E

26

26C

START

IS DELETE INSTRUCTION FOR SOME OF DIVIDED MESSAGES ACCEPTED? ~S300

NO

YES

DELETE ALL DIVIDED MESSAGES ~S302

END

26F1        26E1        26A

SOFTWARE NEEDS TO BE UPDATED.

STOP

DESTINATION: O × COMPANY
DOCUMENT SIZE: A4
IMAGE QUALITY: HIGH IMAGE QUALITY
PAGE: 5

26D

26

26F2      26E2

THERE ARE TWO OTHER NOTIFICATIONS.

ADD DOCUMENT

26H

START

26I

INFORMATION PROCESSING APPARATUS, NON-TRANSITORY COMPUTER READABLE MEDIUM STORING INFORMATION PROCESSING PROGRAM, AND INFORMATION PROCESSING METHOD FOR NOTIFYING USER WITH NOTIFICATION MESSAGE WHILE AVOIDING IMPORTANT IMAGE

CROSS-REFERENCE TO RELATED APPLICATIONS

This application is based on and claims priority under 35 USC 119 from Japanese Patent Application No. 2021-207589 filed Dec. 21, 2021.

BACKGROUND

(i) Technical Field

The present invention relates to an information processing apparatus, a non-transitory computer readable medium storing an information processing program, and an information processing method.

(ii) Related Art

JP2018-005428A discloses a display input apparatus including a display unit that displays a text or an image, a touch panel that is disposed on the display unit and which accepts a press input for a soft button displayed on a display screen of the display unit, a display control unit that controls a display on the display screen displayed on the display unit, and a message control unit that instructs the display control unit to display a message to be displayed on the display unit. In this display control unit, in a case where a display instruction of a message is received from the message control unit in a state in which the display screen is displayed on the display unit, the message is pop-up displayed at a pop-up display position set at a position other than a predetermined display region, on the display screen. Further, this touch panel accepts the press input for the soft button even while the pop-up is being displayed by the display control unit.

JP2013-105182A discloses an operation display apparatus including a touch panel and a control apparatus that controls a display on the touch panel. With this control apparatus, a first display process of displaying a first screen, which is an operation screen, on the touch panel, and a second display process of displaying a second screen, which is a notification screen and smaller than the first screen, to be superimposed on the first screen is executed after the first display process. Further, this second display process includes a step of detecting a touch on the touch panel, a step of specifying a display position of the second screen in a display region of the touch panel not including a position of the detected touch, and a step of displaying the second screen at the specified display position. In a case of accepting a touch to a position, which is a position other than the second screen and at which the first screen is displayed, of the touch panel on which the second screen is displayed, this control apparatus accepts the touch as an instruction input for the first screen.

SUMMARY

In a case where a notification message for notifying a user is newly displayed, the notification message is superimposed on a display image that is previously displayed, in some cases. Here, the display image includes an image having a higher importance than other images, for example, which may lead to a misunderstanding or erroneous operation of the user due to the superimposed notification message, in some cases.

Aspects of non-limiting embodiments of the present disclosure relate to an information processing apparatus, a non-transitory computer readable medium storing an information processing program, and an information processing method that visually recognize, even in a case where a notification message is newly displayed, an important image having an importance higher than a predetermined threshold value, among display images.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a processor configured to: in a case where a notification message for notifying a user is newly displayed, display the notification message while avoiding an important image having an importance higher than a predetermined threshold value, among display images that are previously displayed.

BRIEF DESCRIPTION OF THE DRAWINGS

Exemplary embodiment(s) of the present invention will be described in detail based on the following figures, wherein.

DETAILED DESCRIPTION

First Exemplary Embodiment

Figures 1, 2:
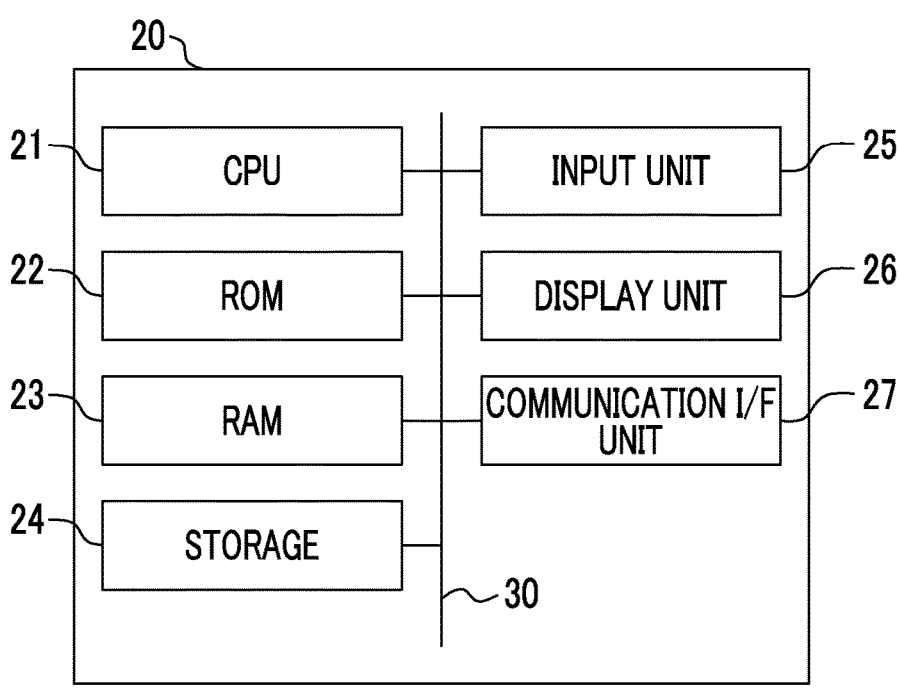
FIG. 1 is a schematic diagram illustrating an example of a hardware configuration of an information processing apparatus according to an exemplary embodiment.
FIG. 2 is a schematic diagram illustrating an example of a configuration of an image database according to the exemplary embodiment.

Hereinafter, an example of a technology of an exemplary embodiment of the present invention will be described with reference to drawings. In each of the drawings, the identical or equivalent components and parts are given the same reference numerals. In addition, in some cases, a dimensional ratio of the drawing is exaggerated for convenience of description and is different from an actual ratio.

As illustrated in FIG. 1, an information processing apparatus 20 includes each configuration of a central processing unit (CPU) 21, a read only memory (ROM) 22, a random access memory (RAM) 23, a storage 24, an input unit 25, a display unit 26, and a communication interface (communication I/F) unit 27. The respective configurations are communicably connected to each other via a bus 30.

The information processing apparatus 20 is an image forming apparatus that executes a print function, a copy function, a scanning function, and a facsimile function. A function executed by the information processing apparatus 20 is not limited to the function described above. Further, a personal computer or the like may be applied as the information processing apparatus 20.

The CPU 21 is a central arithmetic processing unit, and executes various programs and controls each unit. That is, the CPU 21 reads a program from the ROM 22 or the storage 24, and executes the program with the RAM 23 as a work area. The CPU 21 controls each configuration described above, and performs various arithmetic processes, according to the program recorded in the ROM 22 or the storage 24. In the present exemplary embodiment, an information processing program 200 and an image database 210 are stored in the ROM 22 or the storage 24. Details of the image database 210 will be described below.

The ROM 22 stores various programs and various types of data. The RAM 23 temporarily stores a program or data as a work area. The storage 24 is configured with a hard disk drive (HDD) or a solid state drive (SSD), and stores various programs and various types of data including an operating system.

The input unit 25 includes a pointing device such as a mouse and a keyboard, and is used for performing various inputs. The display unit 26 is, for example, a liquid crystal display, and displays various types of information. The display unit 26 may adopt a touch panel method, and may also function as the input unit 25.

The communication interface unit 27 is an interface for communicating with other devices, and uses standards such as Ethernet (registered trademark), FDDI, Wi-Fi (registered trademark), and the like, for example.

The information processing apparatus 20 has a main control unit that notifies the CPU 21 of details of a state change in a case where the state change of a job, the information processing apparatus 20, or the like is detected, and the main control unit is not illustrated to avoid complications. Further, the information processing apparatus 20 has a processing mechanism as a device that controls the information processing apparatus 20 such as an image input terminal (IIT), an image output terminal (IoT), or a facsimile apparatus, and the processing mechanism is not illustrated to avoid complications.

Next, the image database 210 according to the present exemplary embodiment will be described with reference to FIG. 2. As illustrated in FIG. 2, the image database 210 according to the present exemplary embodiment stores a plurality of pieces of image information on an image that is displayable on the display unit 26. In FIG. 2, each row represents image information. In each image information, each information of a name, an importance, a display position, and a shape is associated with each other.

The name described above is information indicating a name of an image to be displayed on the display unit 26. The importance described above is information indicating a predetermined importance of an image related to the corresponding name. In the present exemplary embodiment, a value from 0 to 100 is applied as the importance. That is, in the present exemplary embodiment, the importance is divided into 100 stages. Meanwhile, the importance described above may be divided into any stage as long as the importance has two or more stages. For example, the importance may be divided into two stages (for example, "high" and "low", 1 and 0, or the like).

The display position described above is information indicating a position at which an upper left end portion of the image related to the corresponding name is displayed on the display unit 26. In other words, the display position described above is information indicating a position at which the display of the image related to the corresponding name is started. In the present exemplary embodiment, the display position is represented by a two-dimensional orthogonal-coordinates system in which an upper left end portion of the display unit 26 is set as a coordinate origin O, and an X coordinate is set along a right direction and a Y coordinate is set along a downward direction, respectively. Meanwhile, the exemplary embodiment is not limited to this example. For example, the coordinate origin may be a lower right end portion of the display unit 26. The shape described above is information indicating a shape of the image related to the corresponding name. In the present exemplary embodiment, a width and length of the image related to the corresponding name are applied as the shape described above. For example, an importance of a stop button is 90, the X coordinate related to the display position is 400 pixels, and the Y coordinate is 0 pixels. A shape of the stop button is 80 pixels in width and 20 pixels in height.

Figure 3:
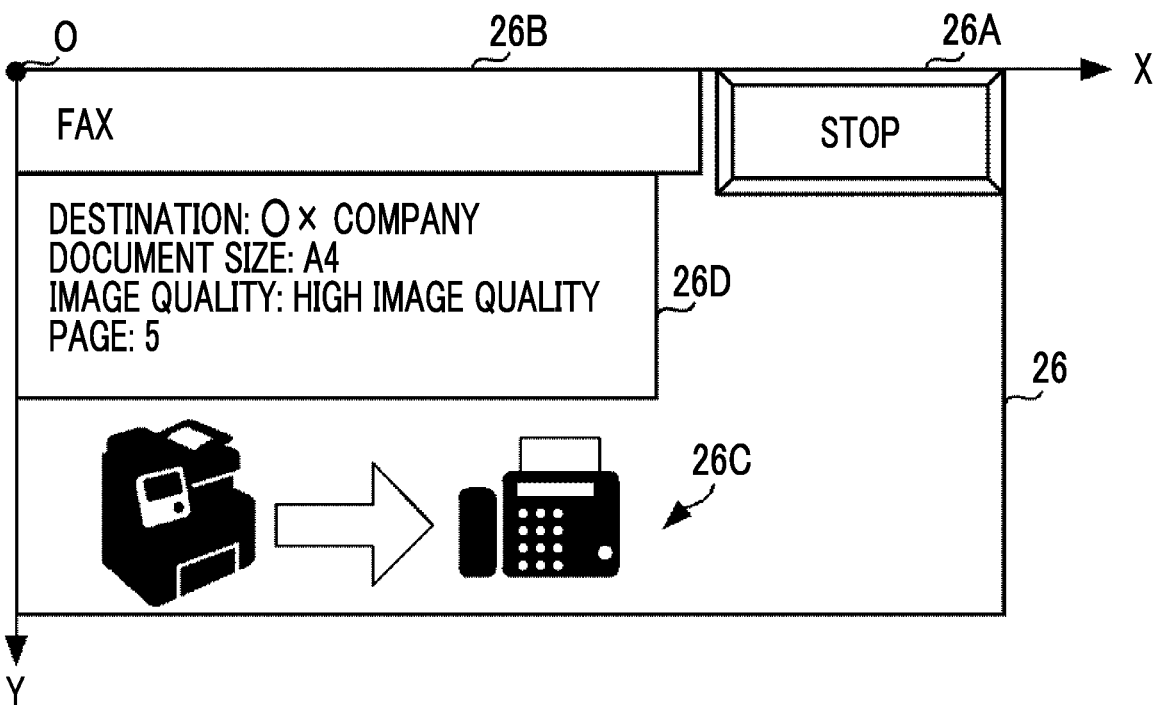
FIG. 3 is a schematic diagram illustrating an example of an execution screen on which an image is displayed according to the exemplary embodiment.

FIG. 3 illustrates an example of the display unit 26 in which an image is displayed on an execution screen illustrating that the information processing apparatus 20 is executing a process. A stop button 26A, a title 26B, an animation 26C, and a text 26D are displayed on the display unit 26. The stop button 26A is an image for accepting an instruction to stop the process being executed by the information processing apparatus 20. The title 26B is an image illustrating a title of the process being executed by the information processing apparatus 20 (fax in the example illustrated in FIG. 3). The animation 26C is an image illustrating the process being executed by the information processing apparatus 20 (in the example illustrated in FIG. 3, an image illustrating that fax transmission is being performed from an image forming apparatus to a telephone). The text 26D is an image illustrating a setting of the process being executed by the information processing apparatus 20 (in the example illustrated in FIG. 3, a destination of the fax process, a size of a document, an image quality, and the number of pages).

Next, an action of the information processing apparatus 20 will be described.

Figure 4:
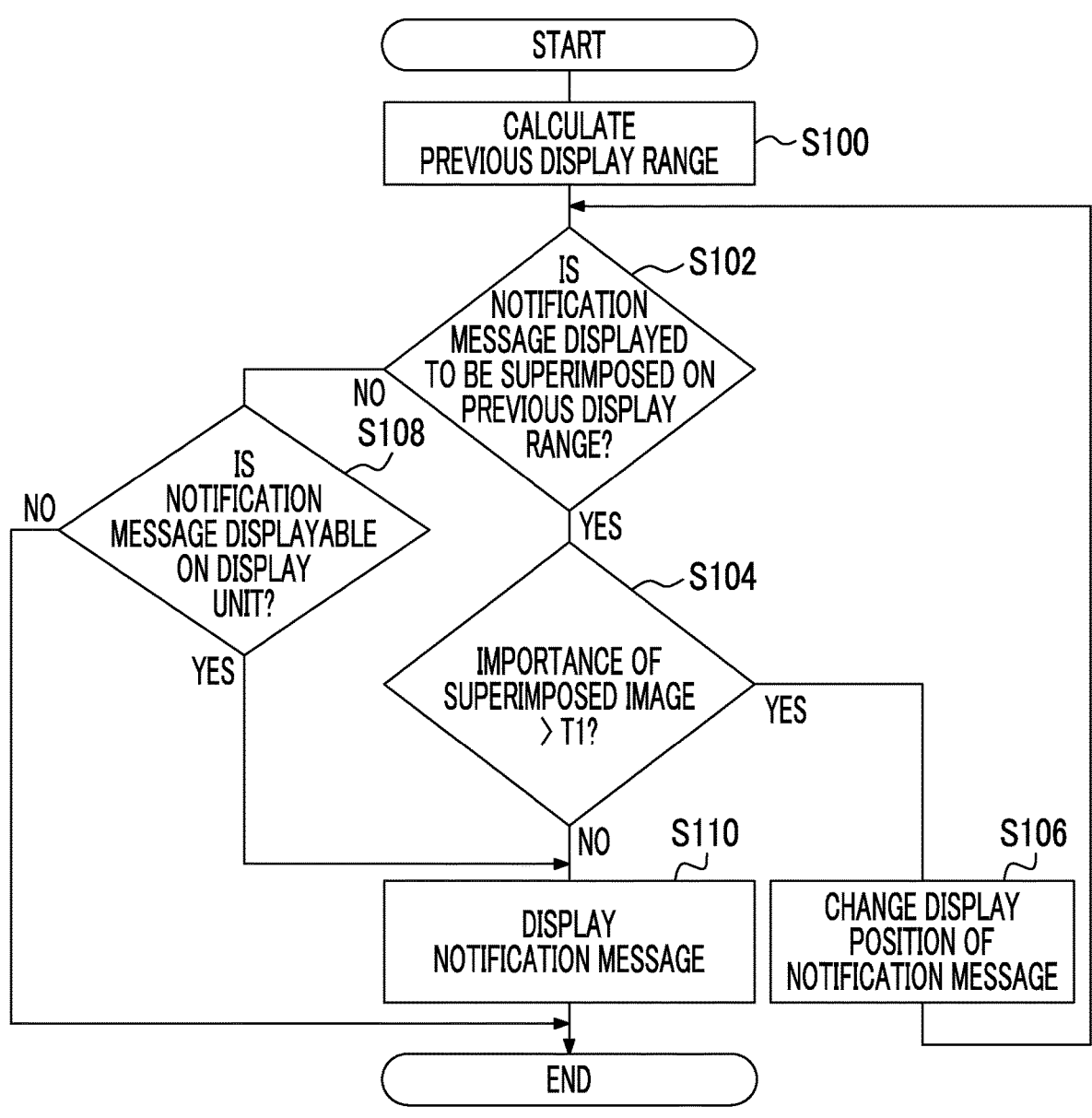
FIG. 4 is a flowchart illustrating an example of an information process according to a first exemplary embodiment.

FIG. 4 is a flowchart illustrating a flow of an information process by the information processing apparatus 20. The CPU 21 reads the information processing program 200 from the ROM 22 or the storage 24, expands the information processing program 200 into the RAM 23, and executes the information processing program 200 so as to perform the information process.

In step S100 in FIG. 4, the CPU 21 calculates a previous display range, which is a range in which an image is previously displayed on the display unit 26. In the following, the image that is previously displayed on the display unit 26 is referred to as a display image. Specifically, in step S100, the CPU 21 calculates the display range of each display image by reading a display position and shape associated with the display image from the image database 210. The CPU 21 calculates the previous display range by adding all the calculated display ranges of each display image.

In step S102, the CPU 21 determines whether or not a notification message for notifying a user is displayed to be superimposed on the previous display range. Specifically, in step S102, the CPU 21 calculates a range for displaying the notification message from the display position and shape of the notification message, and determines whether or not the calculated range is within the previous display range. In the present exemplary embodiment, as the notification message, a message to notify the user in order to assist the operation of the information processing apparatus 20 is applied. Further, in the present exemplary embodiment, the X coordinate related to the display position of the notification message is set to 0 pixels, and the Y coordinate related to the display position of the notification message is set to 0 pixels, which is predetermined by an administrator of the information processing apparatus 20 or the like. Further, the shape of the notification message is predetermined by the administrator of the information processing apparatus 20 or the like with a width of 480 pixels and a height of 60 pixels. Meanwhile, the display position and shape of the notification message are not limited to these examples. The display position and shape of the notification message may be any value as long as the notification message is a value that is displayable on the display unit 26.

In a case where the CPU 21 determines that the notification message is displayed to be superimposed on the previous display range (YES in step S102), the CPU 21 proceeds to step S104. On the other hand, in a case where the CPU 21 determines that the notification message is displayed not to be superimposed on the previous display range, in other words, in a case where it is determined that the notification message avoids the display image and is displayed (NO in step S102), the CPU 21 proceeds to step S108.

In step S104, the CPU 21 determines whether or not an importance of a superimposed image, which is a display image to be superimposed on the notification message, is higher than a predetermined threshold value T1 (for example, 50), from the image database 210. In the present exemplary embodiment, a threshold value predetermined by the administrator of the information processing apparatus 20 or the like is applied as the predetermined threshold value T1. Meanwhile, the exemplary embodiment is not limited to this example. For example, an average value of importances of all display images may be applied as the predetermined threshold value T1. In a case where the CPU 21 determines that the importance of the superimposed image is higher than the predetermined threshold value T1 (YES in step S104), the CPU 21 proceeds to step S106. On the other hand, in a case where the CPU 21 determines that the importance of the superimposed image is equal to or less than the predetermined threshold value T1 (NO in step S104), the CPU 21 proceeds to step S110. In a case where there are a plurality of superimposed images, the CPU 21 proceeds to step S106 in a case where it is determined that the importance of at least one superimposed image is higher than the predetermined threshold value T1. On the other hand, in a case where the CPU 21 determines that the importances of all the superimposed images are equal to or less than the predetermined threshold value T1, the CPU 21 proceeds to step S110. Meanwhile, the exemplary embodiment is not limited to this example. For example, the CPU 21 may proceed to step S110 in a case where it is determined that the importance of at least one superimposed image is equal to or less than the predetermined threshold value T1.

In step S106, the CPU 21 changes the display position of the notification message, and returns to step S102. In step S106, the CPU 21 does not change the shape of the notification message from the shape predetermined by the administrator of the information processing apparatus 20 or the like. In the present exemplary embodiment, in step S106, the CPU 21 adds 20 pixels to the Y coordinate related to the display position of the notification message. In other words, the CPU 21 shifts the display position of the notification message by 20 pixels in a downward direction, on the display unit 26. Meanwhile, the exemplary embodiment is not limited to this example. The CPU 21 may change at least one of the X coordinate or the Y coordinate related to the display position of the notification message to any value.

In step S108, the CPU 21 determines whether or not the notification message is displayable on the display unit 26. Specifically, in step S108, the CPU 21 determines whether or not a range for displaying the notification message calculated from the display position and shape of the notification message is within a range in which the image on the display unit 26 is displayable. In a case where the CPU 21 determines that the notification message is displayable on the display unit 26 (YES in step S108), the CPU 21 proceeds to step S110.

In step S110, the CPU 21 displays the notification message at the determined display position, and ends the present information process.

On the other hand, in a case where the CPU 21 determines that the notification message is not displayable on the display unit 26 (NO in step S108), the CPU 21 ends the present information process. In other words, in a case where the CPU 21 determines that the notification message is not displayable on the display unit 26 (NO in step S108), the CPU 21 does not display the notification message.

In a case where the importances of all the display images are higher than the predetermined value T1 and the notification message cannot be displayed on the display unit 26 without being superimposed on the previous display range, the CPU 21 ends the information process without displaying the notification message. In this case, the CPU 21 executes the information process again at a timing of a screen transition. The CPU 21 displays the notification message in a case where the notification message can be displayed while avoiding the image of which the importance is higher than the predetermined threshold value T1, among the display images.

Figure 5:
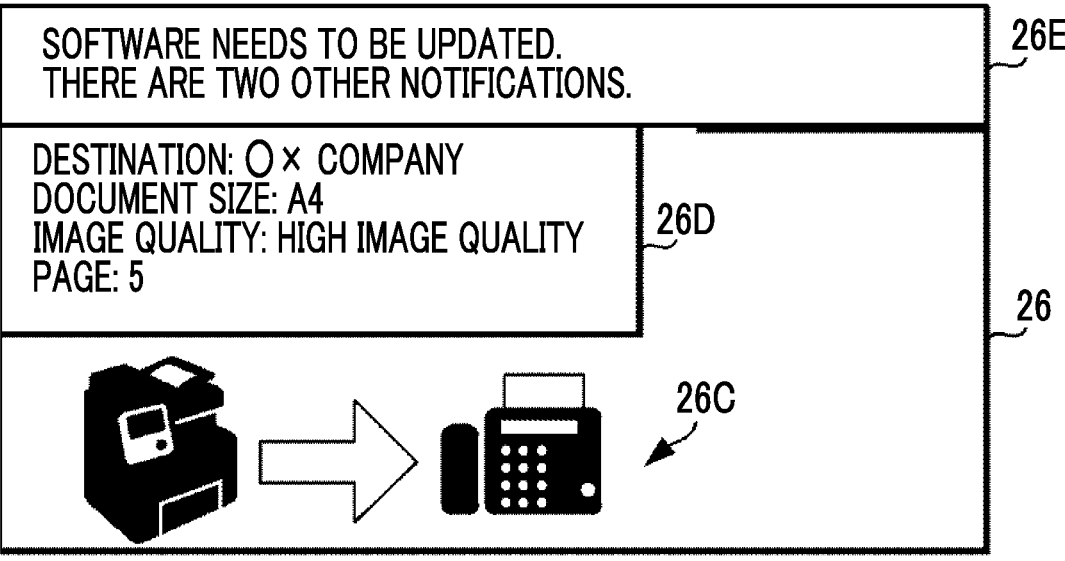
FIG. 5 is a schematic diagram illustrating an example of a case where a notification message is displayed on the execution without applying the first exemplary embodiment.
Figure 6:
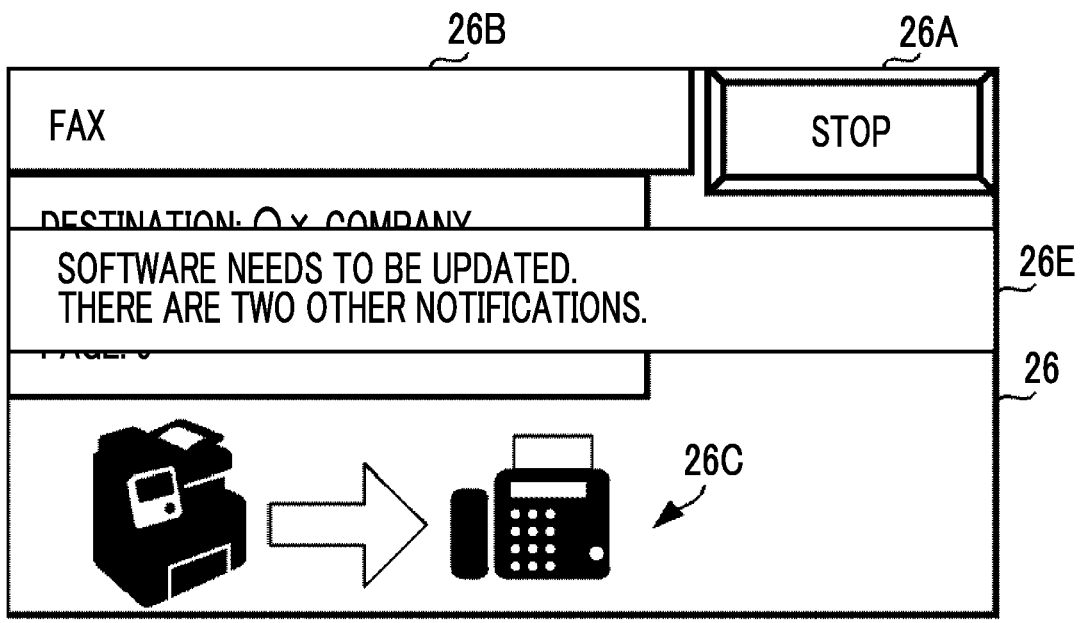
FIG. 6 is a schematic diagram illustrating another example of the case where the notification message is displayed on the execution screen without applying the first exemplary embodiment.
Figure 7:
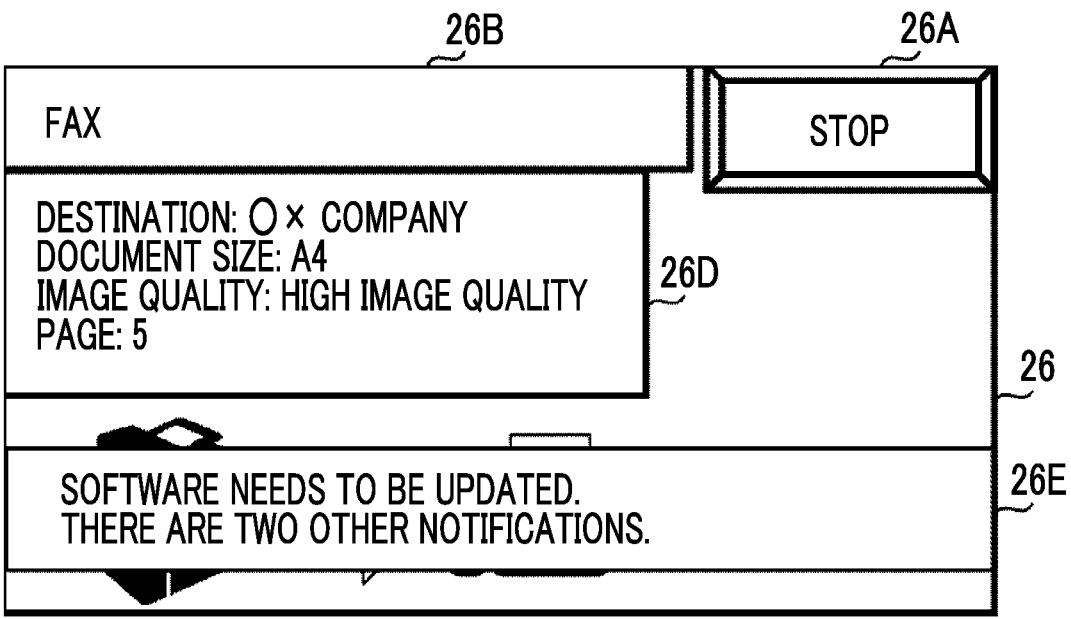
FIG. 7 is a schematic diagram illustrating an example of a case where the notification message is displayed on the execution screen by applying the first exemplary embodiment.

FIGS. 5 and 6 illustrate an example in which a notification message is displayed on an execution screen without applying the present exemplary embodiment. Further, FIG. 7 illustrates an example in which the notification message is displayed on the execution screen by applying the present exemplary embodiment. For example, it is considered that in the execution screen illustrated in FIG. 3, an importance of the stop button 26A is 90, an importance of the title 26B is 40, an importance of the animation 26C is 10, and an importance of the text 26D is 60, and the predetermined threshold value T1 is set to 30. In a case of comparing FIG. 3 and FIG. 5, in the example illustrated in FIG. 5, a notification message 26E is displayed to be superimposed on the stop button 26A and the title 26B. Further, in a case of comparing FIG. 3 and FIG. 6, in the example illustrated in FIG. 6, the notification message 26E is displayed to be superimposed on the text 26D. Therefore, the user cannot operate the stop button 26A, and cannot visually recognize the title 26B and the text 26D. On the other hand, in a case of comparing FIG. 3 and FIG. 7, in the example illustrated in FIG. 7, the notification message 26E is displayed at a display position at which only the animation 26C having an importance equal to or less than the predetermined threshold value T1 is superimposed. In other words, in the example illustrated in FIG. 7, the notification message 26E is displayed while avoiding the stop button 26A, the title 26B, and the text 26D of which the importances are higher than the predetermined threshold value T1.

Figure 8:
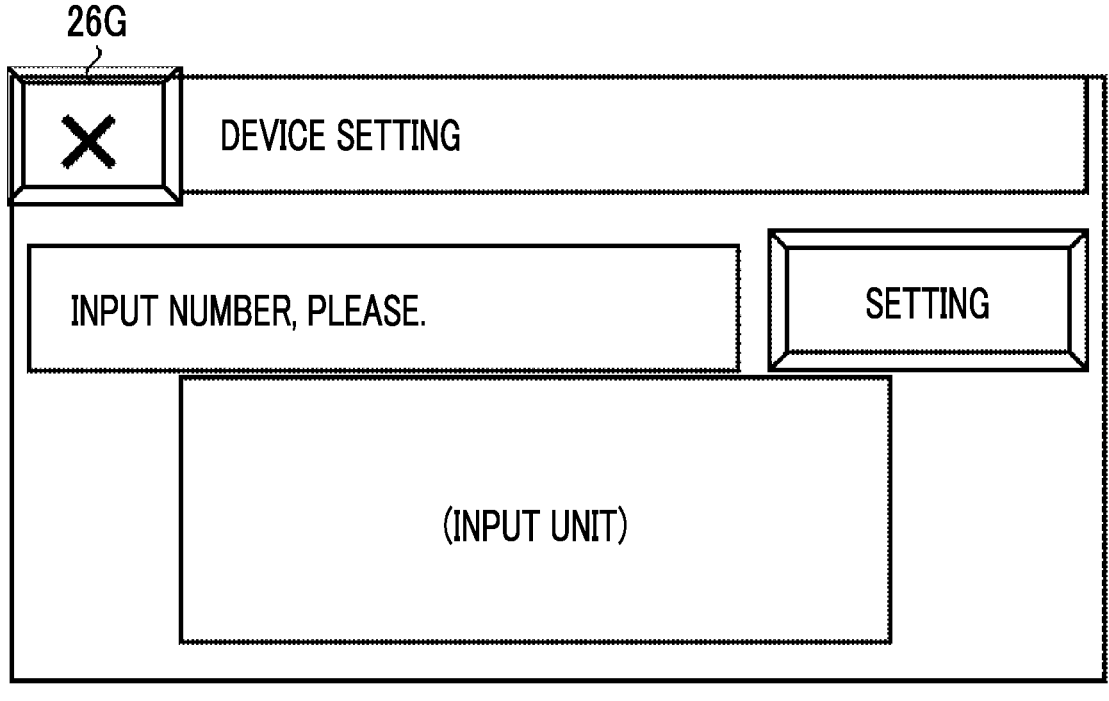
FIG. 8 is a schematic diagram illustrating an example of a case where the notification message is displayed on a setting screen without applying the first exemplary embodiment.
Figure 8:
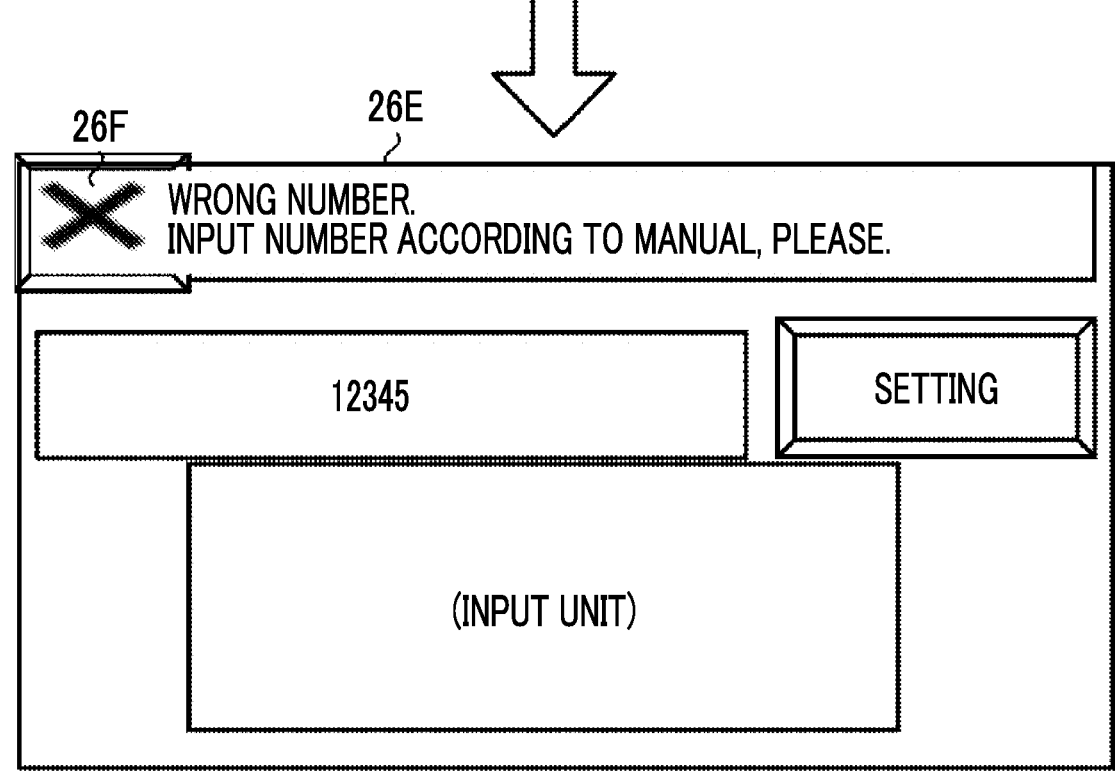

Next, FIG. 8 illustrates an example of a case where a notification message is displayed on a setting screen for determining a setting of the information processing apparatus 20 without applying the present exemplary embodiment. As illustrated in an upper part in FIG. 8, a screen delete button 26G for deleting the display of the setting screen is displayed at an upper left end portion of the setting screen. As illustrated in a lower part in FIG. 8, in a case where a delete button 26F for deleting the display of the notification message 26E is displayed at the upper left end portion of the setting screen, the delete button 26F is displayed to be superimposed on the screen delete button 26G. Here, in a case where the display of the notification message 26E is deleted even in a case where there is no instruction from the user after a predetermined time elapses from the display of the notification message 26E (for example, 10 seconds later), the display of the notification message 26E is deleted with the lapse of the predetermined time, at a timing when the user selects the delete button 26F, in some cases. In this case, although the user intends to select the delete button 26F, the screen delete button 26G may be selected and the display of the setting screen may be unintentionally deleted.

Figure 9:
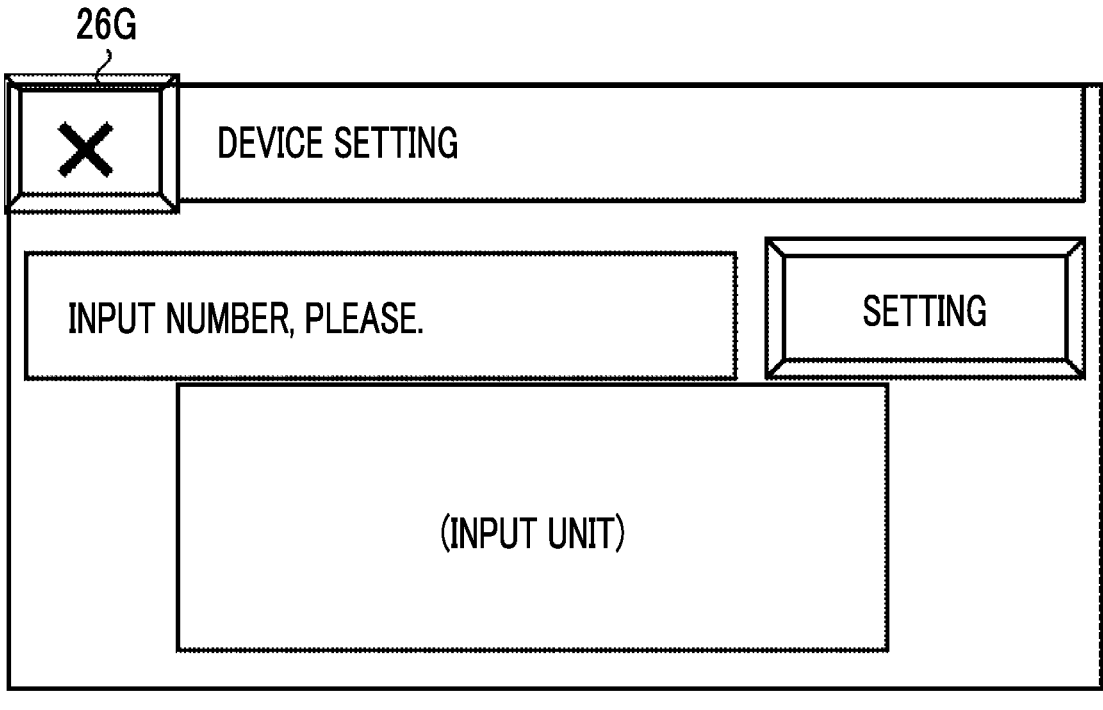
FIG. 9 is a schematic diagram illustrating an example of a case where the notification message is displayed on the setting screen by applying the first exemplary embodiment.
Figure 9:
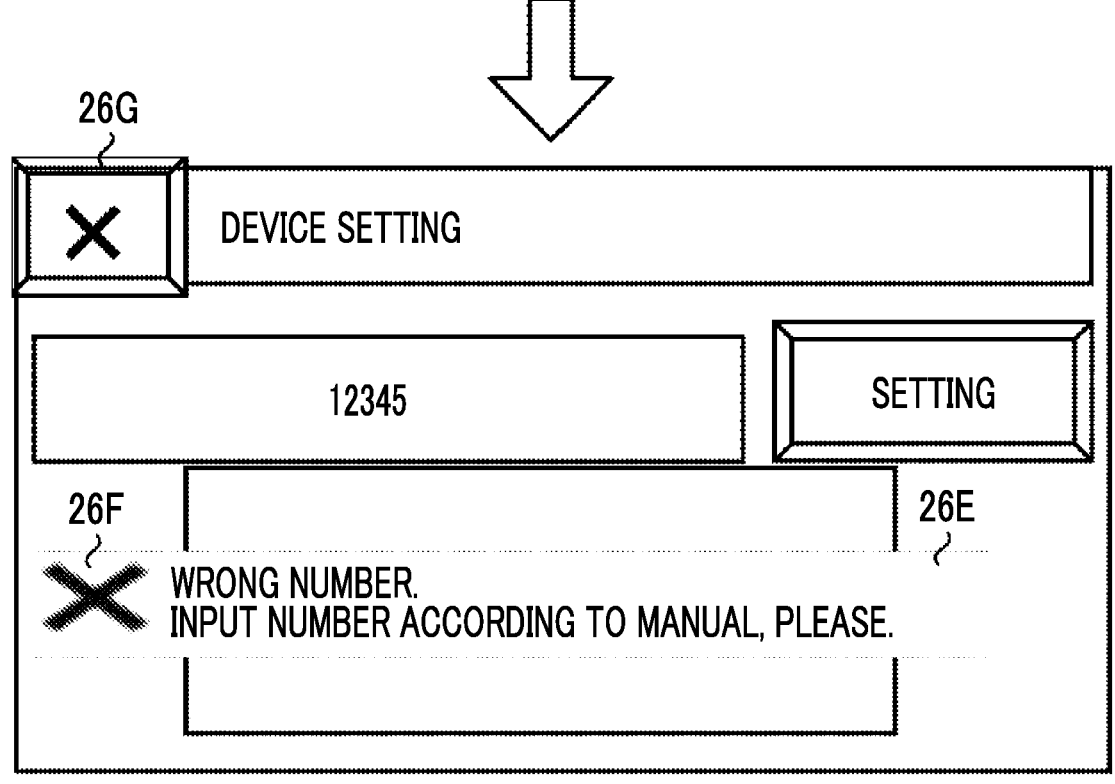

Next, FIG. 9 illustrates an example of a case where a notification message is displayed on a setting screen by applying the present exemplary embodiment. In the same manner as FIG. 8, it is considered that the screen delete button 26G is displayed at an upper left end portion of the setting screen, and after a predetermined time elapses since the notification message 26E is displayed, the display of the notification message 26E is deleted even in a case where there is no instruction from the user. In a case where the present exemplary embodiment is applied and an importance of the screen delete button 26G is set to a value higher than the predetermined threshold value T1, the notification message 26E is displayed at a display position avoiding the screen delete button 26G. As a result, since the delete button 26F is also displayed avoiding the screen delete button 26G, it is possible to prevent the display of the setting screen from being unintentionally deleted.

Second Exemplary Embodiment

In the first exemplary embodiment, the CPU 21 does not change the shape of the notification message, but changes only the display position. In a second exemplary embodiment, the CPU 21 divides a notification message, and displays the divided notification message at different positions. Since a hardware configuration has the same manner as the hardware configuration of the first exemplary embodiment, the description thereof is omitted.

Figure 10:
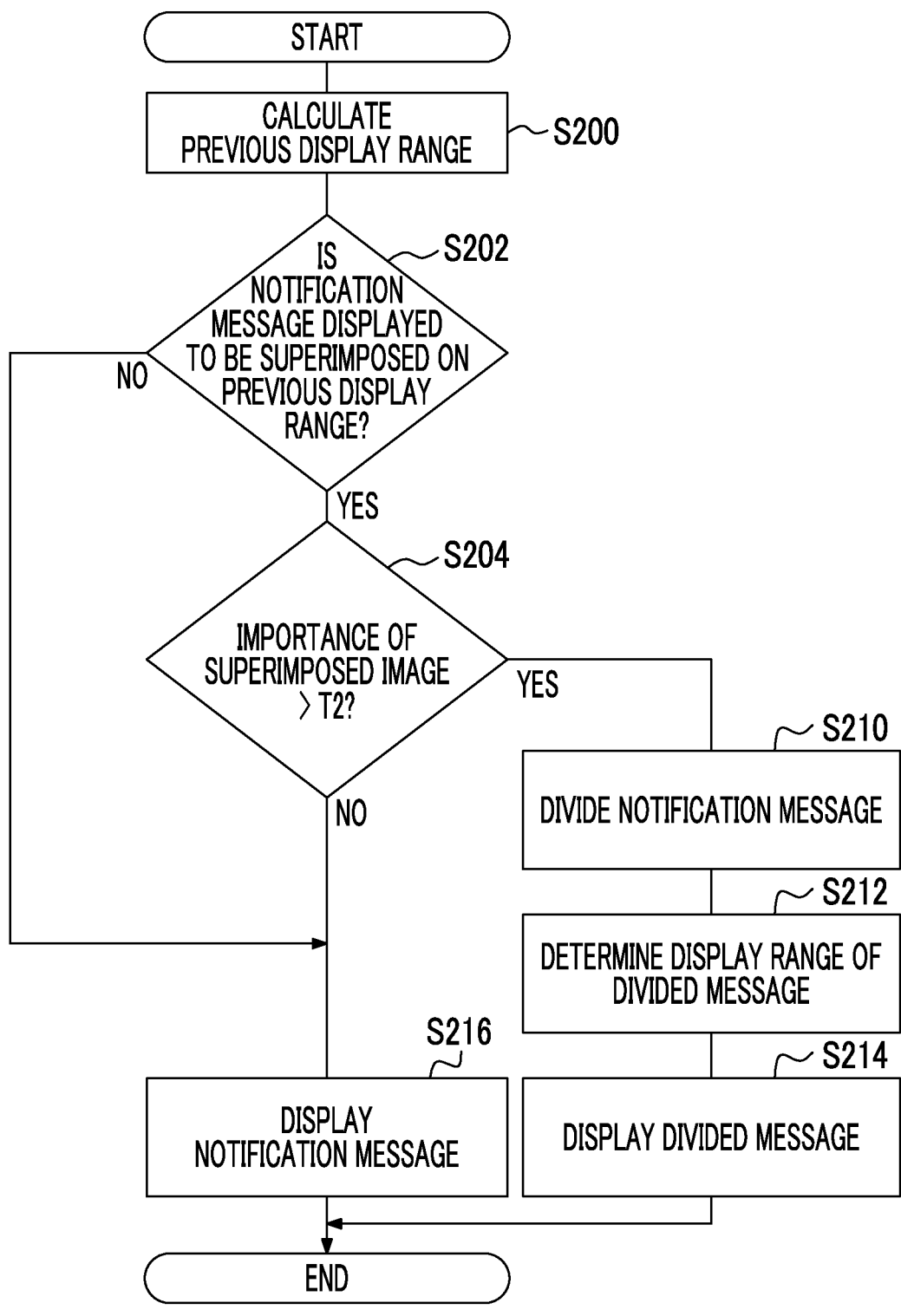
FIG. 10 is a flowchart illustrating an example of an information process according to a second exemplary embodiment.

FIG. 10 illustrates a flowchart illustrating a flow of an information process by the information processing apparatus 20 according to the present exemplary embodiment.

In step S200 in FIG. 10, the CPU 21 calculates a previous display range. Specifically, in step S200, the CPU 21 calculates the display range of each display image by reading a display position and shape associated with the display image from the image database 210. The CPU 21 calculates the previous display range by adding all the calculated display ranges of each display image.

In step S202, the CPU 21 determines whether or not a notification message is displayed to be superimposed on the previous display range. Specifically, in step S202, the CPU 21 calculates a range for displaying the notification message from the display position and shape of the notification message, and determines whether or not the calculated range is within the previous display range. In the same manner as the first exemplary embodiment, as the notification message, a message to notify the user in order to assist the operation of the information processing apparatus 20 is applied. Further, the X coordinate related to the display position of the notification message is set to 0 pixels, and the Y coordinate related to the display position of the notification message is set to 0 pixels, which is predetermined by an administrator of the information processing apparatus 20 or the like. Further, the shape of the notification message is predetermined by the administrator of the information processing apparatus 20 or the like with a width of 480 pixels and a height of 60 pixels. Meanwhile, the display position and shape of the notification message are not limited to these examples. The display position and shape of the notification message may be any value as long as the notification message is displayable on the display unit 26.

In a case where the CPU 21 determines that the notification message is displayed to be superimposed on the previous display range (YES in step S202), the CPU 21 proceeds to step S204. On the other hand, in a case where the CPU 21 determines that the notification message is displayed not to be superimposed on the previous display range, in other words, in a case where it is determined that the notification message avoids the display image and is displayed (NO in step S202), the CPU 21 proceeds to step S216.

In step S204, the CPU 21 determines whether or not an importance of the superimposed image is higher than a predetermined threshold value T2, from the image database 210. In the present exemplary embodiment, the lowest importance in the display image is applied as the predetermined threshold value T2. Meanwhile, the exemplary embodiment is not limited to this example. For example, as the predetermined threshold value T2, a threshold value predetermined by the administrator of the information processing apparatus 20 or the like may be applied, or an average value of importances of all display images may be applied. Further, the predetermined threshold value T2 may be a value identical with the predetermined threshold value T1 or may be a different value. In a case where the CPU 21 determines that the importance of the superimposed image is higher than the predetermined threshold value T2 (YES in step S204), the CPU 21 proceeds to step S210. In a case where there are a plurality of superimposed images, the CPU 21 proceeds to step S210 in a case where it is determined that the importance of at least one superimposed image is higher than the predetermined threshold value T2. Meanwhile, the exemplary embodiment is not limited to this example. For example, the CPU 21 may proceed to step S210 in a case where it is determined that the importances of all the superimposed images are equal to or less than the predetermined threshold value T2.

In step S210, the CPU 21 divides the notification message. In the present exemplary embodiment, in step S210, the CPU 21 divides the notification message for each period included in the notification message. Meanwhile, the exemplary embodiment is not limited to this example. For example, in a case where the notification message is not displayable by avoiding a display image of which an importance is higher than the predetermined threshold value T2 in a case where the notification message is divided for each period, the CPU 21 may divide the notification message for each comma or for each predetermined number of texts regardless of a punctuation point. In the following, each notification message divided by the CPU 21 in step S210 is referred to as a divided message.

In step S212, the CPU 21 determines a display range of each divided message so that the divided messages can be displayed at different positions while avoiding the display image having a higher importance than the predetermined threshold value T2. Specifically, in step S212, the CPU 21 determines each of the display position and shape of the divided message so that the divided message is displayed in a range other than the previous display range, or in a range in which a display image having an importance equal to or less than the predetermined threshold value T2 is displayed.

In step S214, the CPU 21 respectively displays the divided messages in the determined display range, and ends the present information process.

On the other hand, in a case where the CPU 21 determines that the importance of the superimposed image is equal to or less than the predetermined threshold value T2 (NO in step S204), the CPU 21 proceeds to step S216. In a case where there are a plurality of superimposed images, the CPU 21 proceeds to step S216 in a case where it is determined that the importances of all the superimposed images are equal to or less than the predetermined threshold value T2. Meanwhile, the exemplary embodiment is not limited to this example. For example, the CPU 21 may proceed to step S216 in a case where it is determined that the importance of at least one superimposed image is equal to or less than the predetermined threshold value T2. In step S216, the CPU 21 displays the notification message, and ends the present information process.

Next, with reference to FIG. 11, a flow of a delete process by the information processing apparatus 20 will be described. The CPU 21 reads the information processing program 200 from the ROM 22 or the storage 24, expands the information processing program 200 into the RAM 23, and executes the information processing program 200 so as to perform the delete process.

Figure 11:
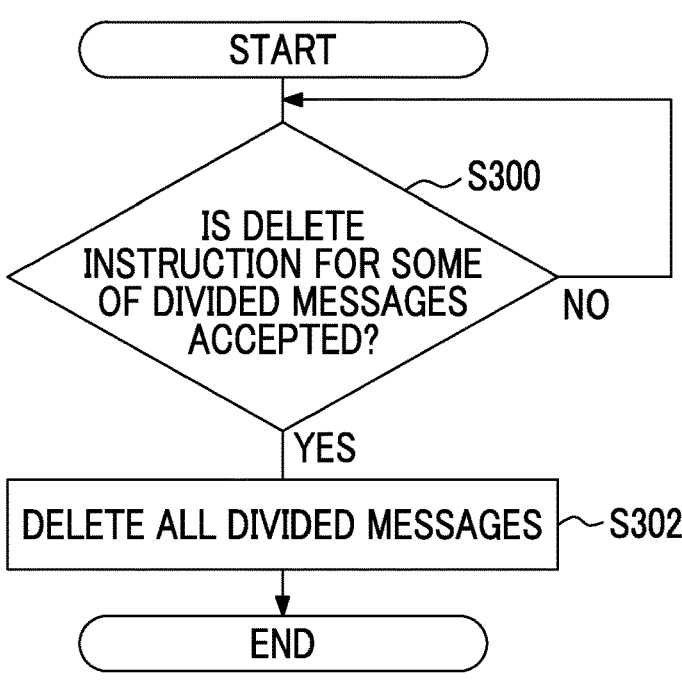
FIG. 11 is a flowchart illustrating an example of a delete process according to the second exemplary embodiment.

In step S300 in FIG. 11, the CPU 21 waits until the CPU 21 accepts an instruction to delete the display of some of divided messages displayed on the display unit 26 via the input unit 25. In other words, the CPU 21 waits until a selection of the delete button 26F related to at least one divided message among the divided messages displayed on the display unit 26 is accepted via the input unit 25. In a case where the CPU 21 accepts the instruction to delete the display of some of the divided messages displayed on the display unit 26 via the input unit 25 (YES in step S300), the CPU 21 proceeds to step S302.

In step S302, the CPU 21 deletes the display of all the divided messages and ends the present delete process.

In the present exemplary embodiment, in a case where the CPU 21 accepts an instruction to delete the display of some of the divided messages, the display of all the divided messages is deleted. Meanwhile, the exemplary embodiment is not limited to this example. In a case where the CPU 21 accepts an instruction to delete the display for some of the divided messages, the display of only the divided messages for which the instruction is accepted may be deleted.

Figure 12:
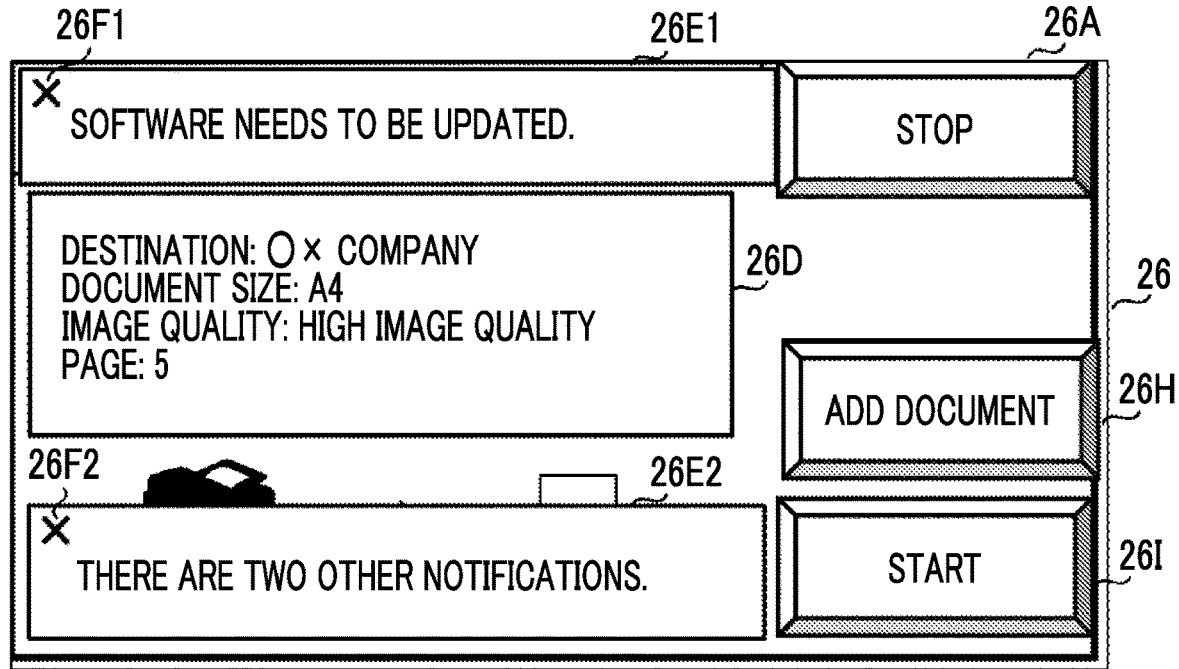
FIG. 12 is a schematic diagram illustrating an example of a case where a notification message is displayed on an execution screen by applying the second exemplary embodiment.

FIG. 12 illustrates an example of a case where divided messages are displayed on an execution screen by applying the present exemplary embodiment. For example, in a case where a document addition button 26H and a start button 26I are added in addition to the image displayed on the execution screen illustrated in FIG. 3, the predetermined threshold value T2 is 10, which is the lowest importance among the display images in a case where an importance of the stop button 26A is defined as 90, an importance of the title 26B is defined as 10, an importance of the animation 26C is defined as 10, an importance of the text 26D is defined as 60, an importance of the document addition button 26H is defined as 90, and an importance of the start button 26I is defined as 90. In the example illustrated in FIG. 12, a divided message 26E1 and a divided message 26E2 are displayed in a shape and a display position at which only the title 26B and the animation 26C of which the importances are equal to or less than the predetermined threshold value T2 are superimposed. In other words, in the example illustrated in FIG. 12, the divided message 26E1 and the divided message 26E2 are displayed while avoiding the stop button 26A, the text 26D, the document addition button 26H, and the start button 26I of which the importances are higher than the predetermined threshold value T1. Further, in the example illustrated in FIG. 12, a delete button 26F1 for deleting the display of the divided message 26E1 and a delete button 26F2 for deleting the display of the divided message 26E2 are displayed. In a case where the delete button 26F1 or 26F2 is selected, the display of the divided message 26E1 and the divided message 26E2 is deleted.

Third Exemplary Embodiment

In a second exemplary embodiment, the CPU 21 always divides a notification message in a case where an importance of a superimposed image is higher than the predetermined threshold value T2. In a third exemplary embodiment, even in a case where the importance of the superimposed image is higher than the predetermined threshold value T2, the notification message is not divided in a case where the number of texts per line of the notification message is larger than a predetermined threshold value W1. Since a hardware configuration has the same manner as the hardware configuration of the second exemplary embodiment, the description thereof is omitted.

Figure 13:
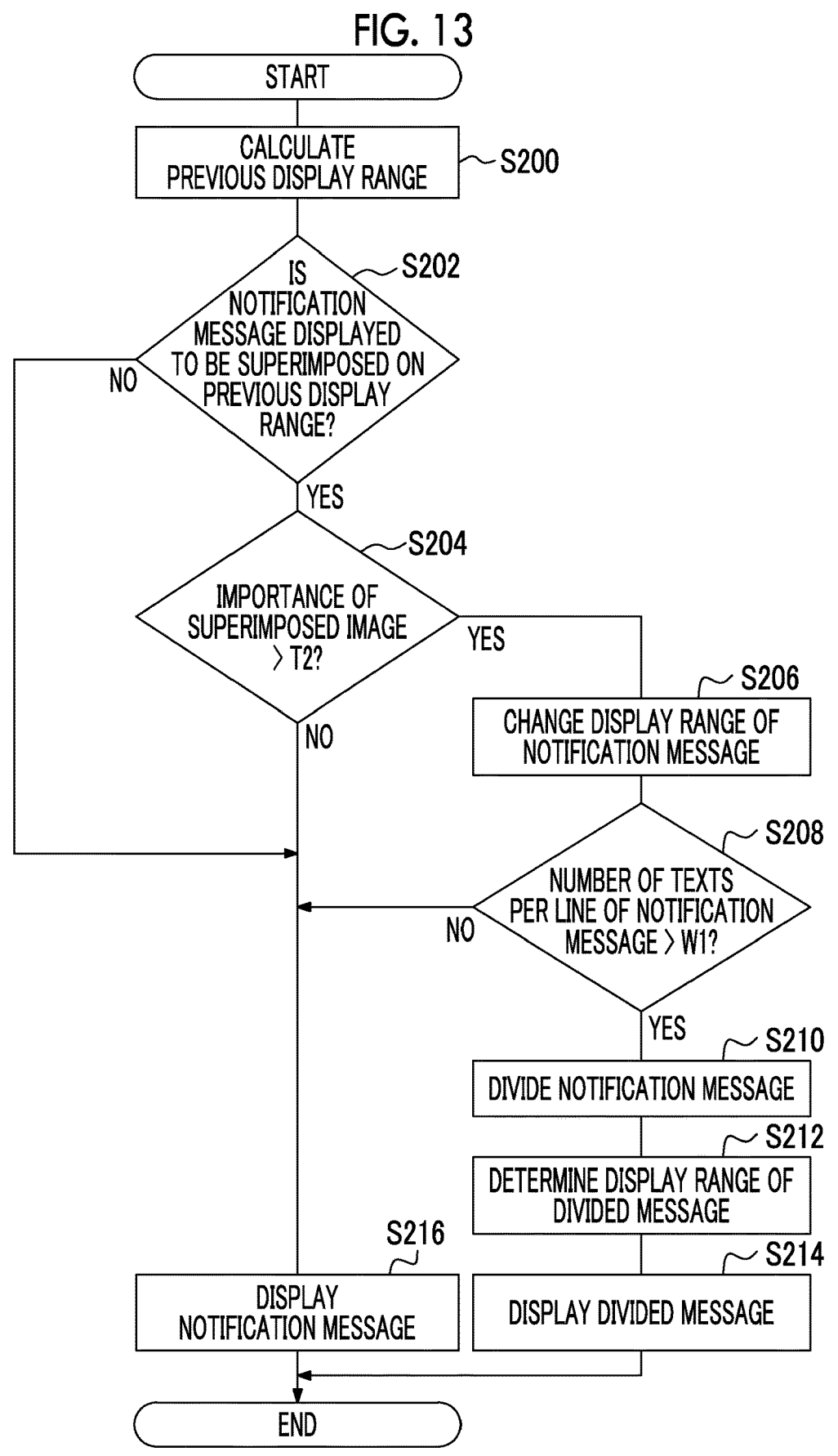
FIG. 13 is a flowchart illustrating an example of an information process according to a third exemplary embodiment.

FIG. 13 illustrates a flowchart illustrating a flow of an information process by the information processing apparatus 20 according to the present exemplary embodiment. A step of executing the identical process as the flow of the information process illustrated in FIG. 10 has a step number identical with the step number in FIG. 10, and the description of the step will be omitted.

The flowchart illustrating the flow of the information process illustrated in FIG. 10 and the flowchart illustrating the flow of the information process illustrated in FIG. 13 have a difference in that the processes in step S206 and step S208 are executed between the processes of step S204 and step S210.

In step S206 in FIG. 13, the CPU 21 changes a display range of a notification message so that the notification message can be displayed while avoiding a display image having a higher importance than the predetermined threshold value T2. Specifically, in step S206, the CPU 21 changes a display position and shape of the notification message so that the notification message is displayed in a range other than the previous display range, or in a range in which a display image having a importance less than or equal to the predetermined threshold value T2 is displayed.

In step S208, the CPU 21 determines whether or not the number of texts per line of the notification message displayed in the display range changed in step S206 is larger than the predetermined threshold value W1. In the present exemplary embodiment, the number of texts predetermined by the administrator of the information processing apparatus 20 or the like is applied as the predetermined threshold value W1. Meanwhile, the exemplary embodiment is not limited to this example. For example, as the predetermined threshold value W1, the number of texts having the largest number of texts per line among the texts displayed on the display image may be applied. In a case where the CPU 21 determines that the number of texts per line of the notification message displayed in the display range changed in step S206 is larger than the predetermined threshold value W1 (YES in step S208), the CPU 21 proceeds to step S210. On the other hand, in a case where the CPU 21 determines that the number of texts per line of the notification message displayed in the display range changed in step S206 is equal to or less than the predetermined threshold value W1 (NO in step S208), the CPU 21 proceeds to step S216.

In a case where the CPU 21 cannot display the notification message not to be superimposed on the previous display range (YES in step S202), the CPU 21 may display the notification message to be superimposed on a display image having the lowest importance without dividing the notification message and without changing the display position and shape. Further, after executing step S206, the CPU 21 may execute step S216 without executing the processes from step S208 to step S214. In other words, the CPU 21 may display the notification message without dividing the notification message and avoiding a display image having an importance higher than the predetermined threshold value T2, regardless of the number of texts per line of the notification message.

Figure 14:
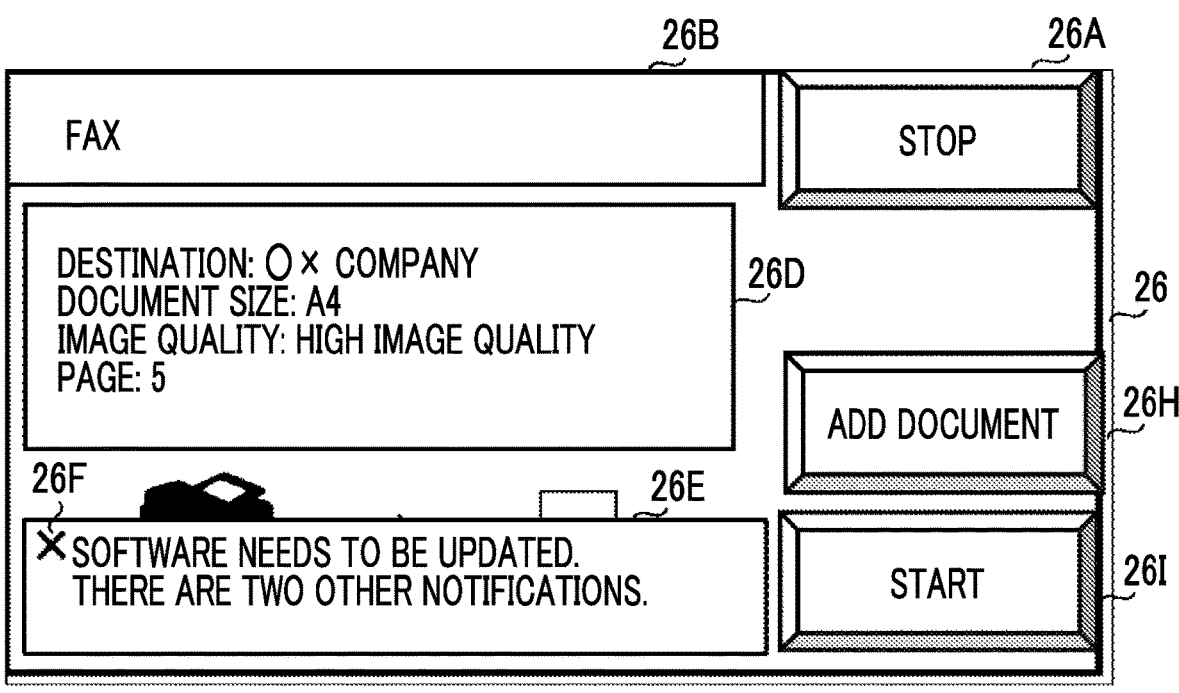
FIG. 14 is a schematic diagram illustrating an example of a case where a notification message is displayed on an execution screen by applying the third exemplary embodiment.

FIG. 14 illustrates an example of a case where a notification message is displayed on an execution screen by applying the present exemplary embodiment. For example, in a case where the document addition button 26H and the start button 26I are added in addition to the image displayed on the execution screen in illustrated FIG. 3, the predetermined threshold value T2 is 10, which is the lowest importance among the display images in a case where the importance of the stop button 26A is defined as 90, the importance of the title 26B is defined as 30, the importance of the animation 26C is defined as 10, the importance of the text 26D is defined as 60, the importance of the document addition button 26H is defined as 90, and the importance of the start button 26I is defined as 90. For example, in a case where the predetermined threshold value W1 is set to 30 texts, the notification message 26E is not divided in a case where the number of texts per line of the notification message 26E is equal to or less than 30 texts. Therefore, for example, as illustrated in FIG. 14, the notification message 26E is displayed in a shape and at a display position at which the notification message 26E is superimposed only on the animation 26C of which the importance is equal to or less than the predetermined threshold value T2. In other words, the notification message 26E is displayed while avoiding the stop button 26A, the title 26B, the text 26D, the document addition button 26H, and the start button 26I of which the importances are higher than the predetermined threshold value T2.

Figure 15:
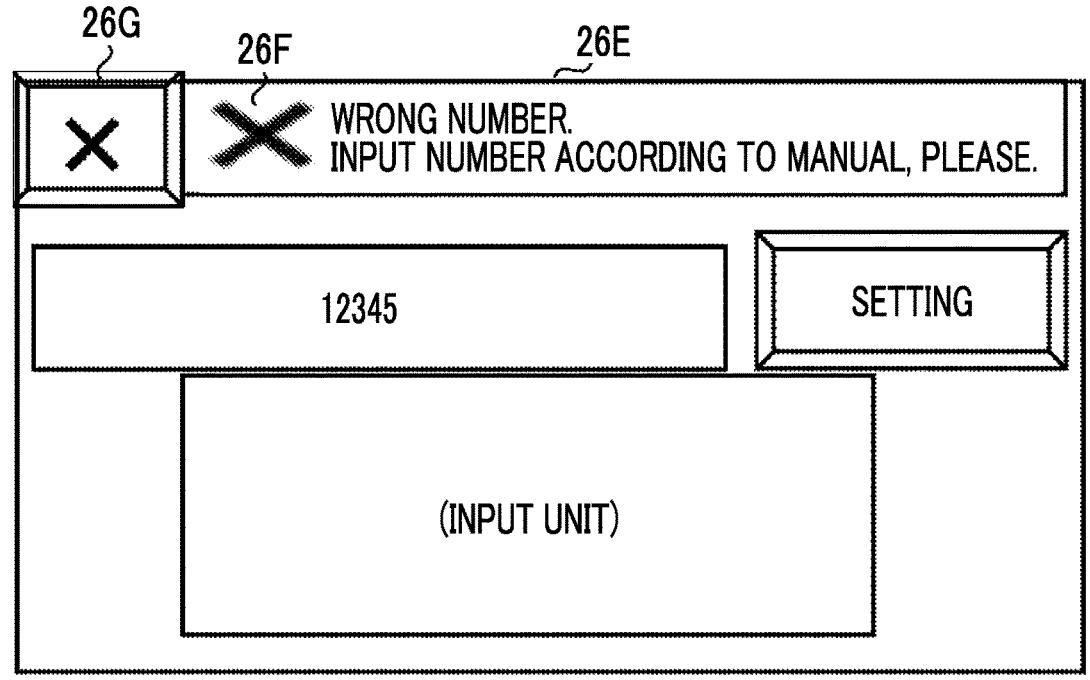
FIG. 15 is a schematic diagram illustrating an example of a case where the notification message is displayed on a setting screen by applying the third exemplary embodiment.

FIG. 15 illustrates an example of a case where a notification message is displayed on a setting screen by applying the present exemplary embodiment. For example, it is assumed that only the importance of the screen delete button 26G in the display image is higher than the predetermined threshold value T2. For example, in a case where the predetermined threshold value W1 is set to 30 texts, the notification message 26E is not divided in a case where the number of texts per line of the notification message 26E is equal to or less than 30 texts. Therefore, for example, as illustrated in FIG. 15, the notification message 26E is displayed at a display position and shape while avoiding the screen delete button 26G having the importance higher than the predetermined threshold value T2.

Although the exemplary embodiments are described above, a technical scope of the present invention is not limited to the scope described in the exemplary embodiments described above. Various modifications or improvements can be added to the exemplary embodiment without departing from the gist of the invention and the modified or improved form is also included in the technical scope of the present exemplary embodiment of the invention.

Further, the exemplary embodiments described above do not limit the invention according to the claim, and not all combinations of features described in the exemplary embodiment are fundamental to the exemplary embodiment of the invention. The exemplary embodiments described above include exemplary embodiments of the inventions at various stages, and various exemplary embodiments of the invention are extracted by combining a plurality of disclosed components. Even in a case where some components are deleted from all the components described in the exemplary embodiment, a configuration in which some of the components are deleted can be extracted as an exemplary embodiment of the invention as long as the effect is obtained.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the present exemplary embodiment, the mode in which the information processing program 200 is installed in the ROM 22 or the storage 24 is described, but the present exemplary embodiment is not limited thereto. The information processing program 200 according to the present exemplary embodiment also may be provided as a mode to be recorded in a computer readable storage medium. For example, the information processing program 200 according to the present exemplary embodiment may be provided as a mode to be recorded on an optical disc such as a compact disc (CD)-ROM and a digital versatile disc (DVD)-ROM, or as a mode to be recorded on a semiconductor memory such as a universal serial bus (USB) memory and a memory card. Further, the information processing program 200 according to the present exemplary embodiment may be acquired from an external apparatus via the communication interface unit 27.

Further, in the exemplary embodiment described above, the case where the information process is realized by the software configuration by using the computer by executing the program is described, and the present invention is not limited thereto. For example, information process may be realized by a hardware configuration or a combination of the hardware configuration and the software configuration.

In addition, the configuration of the information processing apparatus 20 described in the above exemplary embodiment is an example, and unnecessary components may be deleted or new components may be added without departing from the gist of the present invention.

Further, the processing flow of the information processing program 200 described in the above exemplary embodiment (see FIGS. 4, 10, 11, and 13) is also an example, and unnecessary steps may be deleted, new steps may be added, or the processing order may be changed without departing from the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
in a case where a notification message for notifying a user is newly displayed on a display screen of the information processing apparatus, change a shape and position of the notification message into a different shape and position so as to avoid an important image having an importance higher than a first threshold value, among display images that are previously displayed, wherein the important image is included in the display images that are previously displayed;

in response to changing the shape and position of the notification message, determine whether a number of texts per line of the notification message is larger than a second threshold value;
in response to determining that the number of texts per line of the notification message is larger than the second threshold value, divide the notification message into divided notification messages; and
display the divided notification messages at positions different from each other while avoiding the important image.

2. The information processing apparatus according to claim 1, wherein the processor is configured to:
in a case where an instruction to delete the display of some of the divided notification messages is accepted, delete the display of all the divided notification messages.

3. A non-transitory computer readable medium storing an information processing program causing a computer to execute a process comprising:
in a case where a notification message for notifying a user is newly displayed on a display screen of an information processing apparatus, changing a shape and position of the notification message into a different shape and position so as to avoid an important image having an importance higher than a first threshold value, among display images that are previously displayed, wherein the important image is included in the display images that are previously displayed;
in response to changing the shape and position of the notification message, determining whether a number of texts per line of the notification message is larger than a second threshold value in response to determining that the number of texts per line of the notification message is larger than the second threshold value, dividing the notification message into divided notification messages; and
displaying the divided notification messages at positions different from each other while avoiding the important image.

4. An information processing method comprising:
in a case where a notification message for notifying a user is newly displayed on a display screen of an information processing apparatus, changing a shape and position of the notification message into a different shape and position so as to avoid an important image having an importance higher than a first threshold value, among display images that are previously displayed, wherein the important image is included in the display images that are previously displayed;
in response to changing the shape and position of the notification message, determining whether a number of texts per line of the notification message is larger than a second threshold value in response to determining that the number of texts per line of the notification message is larger than the second threshold value, dividing the notification message into divided notification messages; and
displaying the divided notification messages at positions different from each other while avoiding the important image.

* * * * *